United States Patent
Wang et al.

(10) Patent No.: US 9,838,972 B2
(45) Date of Patent: *Dec. 5, 2017

(54) METHOD FOR CONTROLLING POWER OF UPLINK CHANNEL, USER EQUIPMENT AND COMMUNICATION SYSTEM

(71) Applicant: FUJITSU LIMITED, Kawasaki-shi, Kanagawa (JP)

(72) Inventors: Yi Wang, Beijing (CN); Lei Zhang, Beijing (CN); Hua Zhou, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/336,339

(22) Filed: Oct. 27, 2016

(65) Prior Publication Data

US 2017/0048804 A1 Feb. 16, 2017

Related U.S. Application Data

(63) Continuation of application No. PCT/CN2014/077055, filed on May 8, 2014.

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/28* (2013.01); *H04W 52/281* (2013.01);
(Continued)

(58) Field of Classification Search
CPC ........ H04B 7/18543; H04B 2001/0416; H04B 10/564; H04W 52/04; H04W 52/146;
(Continued)

(56) References Cited

U.S. PATENT DOCUMENTS 9,307,503 B2 4/2016 Xu et al.
2002/0163900 A1* 11/2002 Hiramatsu ............ H04W 72/10
370/337
(Continued)

FOREIGN PATENT DOCUMENTS

CN 101026402 A 8/2007
CN 102045823 A 5/2011
(Continued)

OTHER PUBLICATIONS

International Search Report issued for corresponding International Patent Application No. PCT/CN2014/077055, mailed on Feb. 15, 2015, with an English translation.
(Continued)

*Primary Examiner* — Dominic Rego
(74) *Attorney, Agent, or Firm* — Myers Wolin, LLC

(57) ABSTRACT

Embodiments of the present disclosure provide a method for controlling power of an uplink channel, a UE and a communication system. The method for controlling power includes: a UE sorts priorities of uplink channels of at least two cells, when transmitting signals of the uplink channels containing uplink control information for the at least two cells within the same subframe; and allocates power for the uplink channels of the at least two cells according to a result of priority sorting; when allocating power for an uplink channel, needed power of one or more uplink channels with lower priorities than that of the uplink channel is taken into account. With the embodiments of the present disclosure, not only power may be allocated for uplink channels of high priorities, but also uplink channels of low priorities may be transmitted punctually, thereby further improving overall performance of uplink information transmission.

18 Claims, 5 Drawing Sheets

(51) Int. Cl.
*H04W 52/28* (2009.01)
*H04W 52/36* (2009.01)
*H04W 72/04* (2009.01)
*H04W 52/34* (2009.01)

(52) U.S. Cl.
CPC ......... *H04W 52/34* (2013.01); *H04W 52/367* (2013.01); *H04W 72/0413* (2013.01)

(58) Field of Classification Search
CPC ... H04W 52/30; H04W 52/322; H04W 52/00; H04W 52/28; H04W 52/367; H04W 72/0413
USPC ...... 455/522, 67.11, 68–70, 450–452.1, 509, 455/435.3, 512, 166.2
See application file for complete search history.

(56) References Cited

U.S. PATENT DOCUMENTS

| | | | |
|---|---|---|---|
| 2010/0172295 A1* | 7/2010 | Sagfors | H04W 52/146 370/328 |
| 2011/0026419 A1* | 2/2011 | Kim | H04W 52/281 370/252 |
| 2011/0038271 A1* | 2/2011 | Shin | H04W 52/146 370/252 |
| 2011/0141928 A1 | 6/2011 | Shin et al. | |
| 2011/0275403 A1* | 11/2011 | Chen | H04W 52/146 455/522 |
| 2011/0306377 A1* | 12/2011 | Shibuya | H04W 72/082 455/513 |
| 2012/0113827 A1 | 5/2012 | Yamada et al. | |
| 2012/0140649 A1 | 6/2012 | Choudhury et al. | |
| 2013/0114461 A1 | 5/2013 | Seo et al. | |
| 2013/0114554 A1 | 5/2013 | Yang et al. | |
| 2013/0176953 A1 | 7/2013 | Stern-Berkowitz et al. | |
| 2013/0178221 A1* | 7/2013 | Jung | H04L 9/0844 455/450 |
| 2013/0195048 A1 | 8/2013 | Ekpenyong et al. | |
| 2013/0286970 A1 | 10/2013 | Wang et al. | |
| 2013/0324182 A1* | 12/2013 | Deng | H04W 52/281 455/522 |
| 2014/0023030 A1* | 1/2014 | Jeong | H04L 5/001 370/329 |
| 2014/0133415 A1* | 5/2014 | Damnjanovic | H04W 76/048 370/329 |
| 2014/0133449 A1 | 5/2014 | Xu et al. | |
| 2014/0192738 A1 | 7/2014 | Nam et al. | |
| 2014/0321389 A1 | 10/2014 | Zhang et al. | |
| 2015/0055454 A1* | 2/2015 | Yang | H04W 36/22 370/230 |
| 2015/0201388 A1 | 7/2015 | Cheng et al. | |
| 2015/0282104 A1* | 10/2015 | Damnjanovic | H04W 52/365 455/522 |
| 2016/0338041 A1 | 11/2016 | Li et al. | |
| 2017/0048804 A1 | 2/2017 | Wang et al. | |
| 2017/0105182 A1 | 4/2017 | Xu et al. | |

FOREIGN PATENT DOCUMENTS

| | | |
|---|---|---|
| CN | 102238644 A | 11/2011 |
| CN | 102300305 A | 12/2011 |
| CN | 102869080 A | 1/2013 |
| CN | 103200663 A | 7/2013 |
| JP | 2012-216969 A | 11/2012 |
| JP | 2014-522161 A | 8/2014 |
| JP | 2014-522212 A | 8/2014 |
| WO | 2012/155518 A1 | 11/2012 |
| WO | 2013/016855 A1 | 2/2013 |
| WO | 2013/025562 A2 | 2/2013 |
| WO | 2013/025562 A3 | 2/2013 |
| WO | 2013/104232 A1 | 7/2013 |

OTHER PUBLICATIONS

Written Opinion of the International Searching Authority issued for corresponding International Patent Application No. PCT/CN2014/077055, mailed on Feb. 15, 2015, with an English translation.
International Search Report issued for corresponding International Patent Application No. PCT/CN2013/081382, dated May 28, 2014, with an English translation.
Written Opinion of the International Searching Authority issued for corresponding International Patent Application No. PCT/CN2013/081382, dated May 28, 2014, with an English translation.
Communication of the substantive examination report issued for corresponding Mexican Patent Application No. MX/a/2016/001799, dated Apr. 26, 2017, with an English translation.
Office Action issued by the Canadian Intellectual Property Office for corresponding Canadian Patent Application No. 2,921,072, dated Mar. 14, 2017.
Dualcomm Incorporated, "On reducing periodic CSI dropping for CA operation", Agenda Item: 7.2.1.2.1, 3GPP TSG RAN WG1 #69, R1-122762, Prague, Czech Republic, May 21-25, 2012.
Notification of Reasons for Refusal issued for corresponding Japanese Patent Application No. 2016-533767, dated on May 23, 2017, with an English translation.
3GPP TS 36.213 V11.3.0, 3rd Generation Partnership Project; Technical Specification Group Radio Access Network; Evolved Universal Terrestrial Radio Access (E-UTRA); Physical layer procedures (Release 11), Jun., 2013.
Extended European search report with supplementary European search report and the European search opinion issued by the European Patent Office for corresponding European Patent Application No. 13891569.9, dated on Feb. 15, 2017.
Dualcomm Incorporated: "Details on UL power control in carrier aggregation setting", Agenda Item: 7.1.5, 3GPP TSG RAN WG1 Meeting #60, R1-101480, San Francisco, USA, Feb. 22-26, 2010.
ETSI TS 136 213 V11.3.0, "LTE; Evolved Universal Terrestrial Radio Access (E-UTRA); Physical layer procedures (3GPP TS 36.213 version 11.3.0 Release 11)", Jul., 2013.
Notice of Preliminary Rejection issued for corresponding Korean Patent Application No. 10-2016-7004552, dated on Jun. 27,2017, with an English translation.
Non-Final Office Action issued by the United States Patent and Trademark Office for corresponding U.S. Appl. No. 15/014,728, electronically delivered on Jul. 27, 2017.

* cited by examiner

METHOD FOR CONTROLLING POWER OF UPLINK CHANNEL, USER EQUIPMENT AND COMMUNICATION SYSTEM

CROSS REFERENCE TO RELATED APPLICATIONS

This application is a continuation application of International Application PCT/CN2014/077055 filed on May 8, 2014, the entire contents of which are incorporated herein by reference.

TECHNICAL FIELD

The present disclosure relates to the field of communications, and in particular to a method for controlling power of an uplink channel, a user equipment (UE) and a communication system.

BACKGROUND

In a long-term evolution (LTE) system, methods for controlling power in transmitting a physical uplink shared channel (PUSCH), a physical uplink control channel (PUCCH), an uplink sounding reference signal (SRS) and a physical random access channel (PRACH) by a UE are defined. When the UE is configured with multiple carriers, independent power control of uplink transmission signal is performed in each serving cell;

when the PUSCH and the PUCCH cannot be transmitted at the same time, a power control formula of the PUSCH is:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \text{[dBm]};\quad(1)$$

and when the PUSCH and the PUCCH can be transmitted at the same time, the power control formula of the PUSCH is:

$$P_{PUSCH,c}(i) = \min \begin{Bmatrix} 10\log_{10}(\hat{P}_{CMAX,c}(i) - \hat{P}_{PUSCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \text{[dBm]};\quad(2)$$

and a power control formula of the PUCCH is:

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \\ \Delta_{F\_PUCCH,c}(F) + \Delta_{TxD}(F') + g(i) \end{Bmatrix} \text{[dBm]}.\quad(3)$$

In the LTE system, if the UE is configured to be unable to transmit the PUSCH and the PUCCH at the same time, the same UE will not transmit the PUSCH and the PUCCH in the same one or more carriers in the same subframe at the same time. And when the UE is configured to be able to transmit the PUSCH and the PUCCH at the same time, the same UE may transmit the PUSCH and the PUCCH in the same one or more carriers in the same subframe at the same time. However, the PUCCH is only transmitted in a primary component carrier (PCC). Uplink control information (UCI) carried by the PUSCH contains UCI of all corresponding carriers, and the uplink information can only be transmitted in a PUSCH in a carrier. That is, the UCI of all the corresponding carriers is either combined, or partially dropped according to a predetermined criterion, and is finally transmitted via a PUCCH and/or a PUSCH in a CC only.

When transmission power of the uplink signal exceeds configured maximum output power (PCMAX) of the UE, that is, outflow of the output power of the UE occurs, transmission power used by the UE in transmitting the above uplink signal will be equal to the PCMAX of the UE. And the UE will adjust power of a corresponding uplink channel.

FIG. 1 is a schematic diagram of simultaneously transmitting multiple PUCCHs by a UE in an LTE-A system at different cells in the same subframe, FIG. 2 is a schematic diagram of simultaneously transmitting multiple PUSCHs by a UE in an LTE-A system at different cells in the same subframe, FIG. 3 is a schematic diagram of simultaneously transmitting PUCCHs and PUSCHs by a UE in an LTE-A system at different cells in the same subframe, and FIG. 4 is a schematic diagram of simultaneously transmitting PUCCHs and PUSCHs by a UE in an LTE-A system at a primary serving cell in the same subframe.

As shown in FIG. 1, as a carrier aggregation technique is used, when the UE is configured with multiple serving cells, simultaneous transmission of multiple PUCCHs at different serving cells in the same subframe will occur; or as shown in FIG. 2, multiple PUSCHs are simultaneously transmitted at different serving cells; or, as shown in FIG. 3, the PUCCHs and PUSCHs are simultaneously transmitted. And on the other hand, as abilities of the UE are enhanced, as shown in FIG. 4, the UE may simultaneously transmit the PUCCHs and PUSCHs at the primary serving cell in the same subframe.

When the above case occurs, that is, the UE needs to simultaneously transmit multiple PUSCHs in the same subframe, or the UE needs to simultaneously transmit PUSCHs and PUCCHs, it will occur that a total sum of transmission power of multiple PUSCHs is greater than the PCMAX of the UE, or a total sum of transmission power of PUSCHs and PUCCHs is greater than the PCMAX of the UE. In order to direct transmission power allocation of the UE in such a case, a power control method in a case where transmission power of a UE is limited is defined in LTE-A standardization, which is as follows:

when only multiple PUSCHs with no UCI need to be simultaneously transmitted, if total transmission power obtained at this moment exceeds the PCMAX of the UE, the UE lowers the transmission power by equal share in each PUSCH, until it is ensured that the total transmission power is less than or equal to the PCMAX of the UE;

when PUSCHs with no UCI and PUCCHs need to be simultaneously transmitted, if total transmission power obtained at this moment exceeds the PCMAX of the UE, the UE first ensures that the transmission power of the PUCCHs is satisfied, and then lowers the transmission power by equal share in each PUSCH with no UCI, until it is ensured that the total transmission power is less than or equal to the PCMAX of the UE, as shown in formula (4);

for example, when the PUSCHs with no UCI and PUCCHs are simultaneously transmitted, the transmission power of the PUCCHs is preferentially ensured:

$$\sum_c w(i) \cdot \hat{P}_{PUSCH,c}(i) \leq (\hat{P}_{CMAX}(i) - \hat{P}_{PUCCH}(i));\quad(4)$$

when PUSCHs with no UCI and PUSCHs with UCI need to be simultaneously transmitted, if total transmission power obtained at this moment exceeds the PCMAX of the UE, the UE first ensures that the transmission power of the PUSCHs with UCI is satisfied, and then lowers the transmission power by equal share in each PUSCH with no UCI, until it is ensured that the total transmission power is less than or equal to the PCMAX of the UE, as shown in formula (5);

for example, when the PUSCHs with no UCI and PUSCHs with UCI are simultaneously transmitted, the transmission power of the PUSCHs with UCI is preferentially ensured:

$$\sum_{c \neq j} w(i) \cdot \hat{P}_{PUSCH,c}(i) \leq (\hat{P}_{CMAX}(i) - \hat{P}_{PUSCH,j}(i)); \quad (5)$$

when PUCCHs, PUSCHs with no UCI and PUSCHs with UCI need to be simultaneously transmitted, if total transmission power obtained at this moment exceeds the PCMAX of the UE, the UE first ensures that the transmission power of the PUCCHs is satisfied, then the transmission power of the PUSCHs with UCI is satisfied, and thereafter lowers the transmission power by equal share in each PUSCH with no UCI, until it is ensured that the total transmission power is less than or equal to the PCMAX of the UE, as shown in formula (6);

for example, when the PUCCHs, PUSCHs with UCI and PUSCHs with no UCI are simultaneously transmitted, the transmission power of the PUCCHs is ensured first, then the transmission power of the PUSCHs with UCI is ensured, and thereafter the transmission power of the PUSCHs with no UCI is ensured:

$$\hat{P}_{PUSCH,j}(i) = \min(\hat{P}_{PUSCH,j}(i), (\hat{P}_{CMAX}(i) - \hat{P}_{PUCCH}(i))), \quad (6)$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)).$$

Power control of an uplink channel for a serving cell, or power control of transmitting an uplink channel by a primary serving cell and a secondary serving cell under a multicarrier technology, is only defined in the current standards.

However, as continuous development of small base stations, there will occur a scenario in Rel. 12 where there exist multiple small base stations under coverage of a macro base station (such as an eNB). Coverage of the small base stations is relatively small, and the number of them is relatively large. The small base stations may occupy frequency points different from or identical to those occupied by the macro base station. Backhauls between the small base stations and the macro base station may be ideal, that is, latency is very small or may be completely neglectable, and a transmission ability is powerful. And more typically, the backhauls are non-ideal, that is, transmission latency is relatively large and the transmission ability is limited. The power control of the uplink channel of the UE in such scenarios are not taken into account in the current standards.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

When a UE transmits uplink signals to at least two cells in the same subframe, power allocation may be performed on the uplink signals according to a predetermined priority criterion. According to an existing priority criterion, such as PUCCH>PUSCH with UCI>PUSCH, in a case where total uplink power is limited, power of PUCCHs may be allocated first, then power is allocated from the remained power for channels of lower priorities, and if there is no remained power, the channels of lower priorities will not be transmitted.

It was found by the inventors that when the UE keeps in connection with two base stations, it is possible that signaling carried by the two base stations and traffic types are different, hence, it is possible that performance required by the two base stations is different. For example, it is possible that a macro base station carries signaling, and a small base station only carries data. Then, in order to ensure performance of control signaling, transmission in the macro base station needs to reach more robust performance. Therefore, when the UE transmits the uplink signals to the two base stations at the same time, it also needs to carry an uplink performance requirement of important information.

If power allocation is performed on uplink signals of at least two cells, or uplink channels are selected, a case may possibly occur where an important channel cannot be transmitted due to insufficient of the allocated power. For example, as a priority of a PUSCH with UCI of the macro base station is lower than that of a PUCCH of a small base station, if power of the PUCCH of the small base station is allocated first and then power is allocated from the remained power for the PUSCH with UCI of the macro base station, the power allocated for the PUSCH with UCI of the macro base station may be insufficient, which results in that important information cannot be transmitted in time and hence the whole performance is degraded.

Embodiments of the present disclosure provide a method for controlling power of an uplink channel, a UE and a communication system. In a case where power of the UE is limited, by taking power needed by uplink channels of relatively low priorities into account, not only power may be allocated for uplink channels of relatively high priorities, but also the uplink channels of relatively low priorities may be transmitted in time, thereby further improving whole performance of uplink information transmission.

According to an aspect of the embodiments of the present disclosure, there is provided a method for controlling power of an uplink channel, applicable to a UE keeping in connection with at least two cells, the method including:

sorting, by the UE, priorities of uplink channels of the at least two cells, when transmitting signals of the uplink channels containing uplink control information for the at least two cells within the same subframe; and allocating power for the uplink channels of the at least two cells according to a result of priority sorting; wherein when allocating power for an uplink channel, needed power of one or more uplink channels with lower priorities than that of the uplink channel is taken into account.

According to another aspect of the embodiments of the present disclosure, there is provided a UE, which keeps in connection with at least two cells, the UE including:

a priority determining unit configured to sort priorities of uplink channels of the at least two cells when transmitting signals of the uplink channels containing uplink control information for the at least two cells within the same subframe; and a power controlling unit configured to allocate power for the uplink channels of the at least two cells according to a result of priority sorting; wherein when allocating power for an uplink channel, needed power of one or more uplink channels with lower priorities than that of the uplink channel is taken into account.

According to a further aspect of the embodiments of the present disclosure, there is provided a communication system, including:

a UE keeping in connection with at least two cells and configured to sort priorities of uplink channels of the at least two cells when transmitting signals of the uplink channels containing uplink control information for the at least two cells within the same subframe, and allocate power for the uplink channels of the at least two cells according to a result of priority sorting; wherein when allocating power for an uplink channel, needed power of one or more uplink channels with lower priorities than that of the uplink channel is taken into account.

According to still another aspect of the embodiments of the present disclosure, there is provided a computer-readable program, wherein when the program is executed in a UE, the program enables the UE to carry out the method for controlling power of an uplink channel as described above.

According to yet another aspect of the embodiments of the present disclosure, there is provided a storage medium in which a computer readable program is stored, wherein the computer readable program enables a UE to carry out the method for controlling power of an uplink channel as described above.

An advantage of the embodiments of the present disclosure exists in that in a case where power of the UE is limited, by taking power needed by uplink channels of relatively low priorities into account, not only power may be allocated for uplink channels of relatively high priorities, but also the uplink channels of relatively low priorities may be transmitted in time, thereby further improving whole performance of uplink information transmission.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

An embodiment of the present disclosure provides a method for controlling power of an uplink channel, applicable to a UE keeping in connection with at least two cells.

Figure 1:
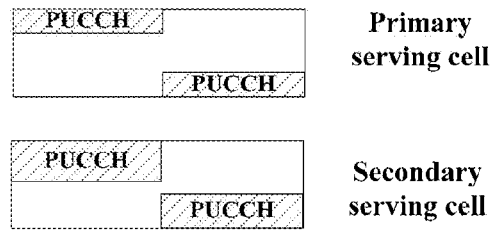
FIG. 1 is a schematic diagram of simultaneously transmitting multiple PUCCHs by a UE in an LTE-A system at different cells in the same subframe.
Figure 2:
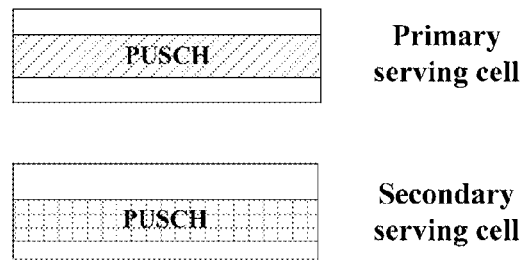
FIG. 2 is a schematic diagram of simultaneously transmitting multiple PUSCHs by a UE in an LTE-A system at different cells in the same subframe.
Figure 3:
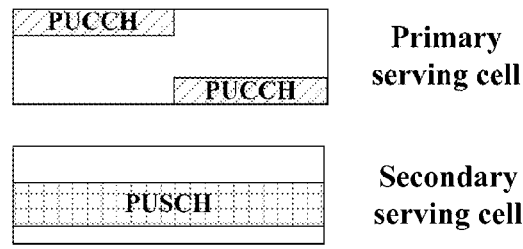
FIG. 3 is a schematic diagram of simultaneously transmitting PUCCHs and PUSCHs by a UE in an LTE-A system at different cells in the same subframe.
Figure 4:
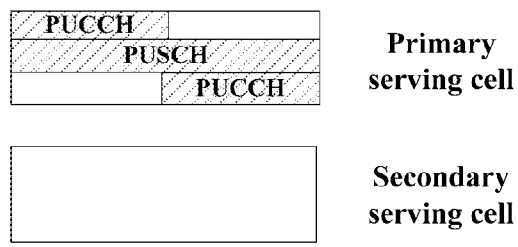
FIG. 4 is a schematic diagram of simultaneously transmitting PUCCHs and PUSCHs by a UE in an LTE-A system at a primary serving cell in the same subframe.
Figure 5:
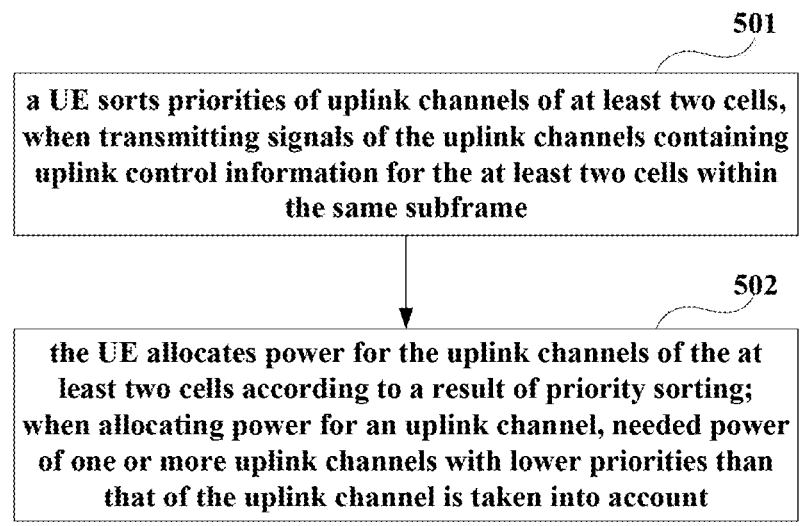
FIG. 5 is a flowchart of the method for controlling power of an embodiment of the present disclosure.

FIG. 5 is a flowchart of the method for controlling power of the embodiment of the present disclosure. As shown in FIG. 5, the method includes:

step 501: the UE sorts priorities of uplink channels of the at least two cells, when transmitting signals of the uplink channels containing uplink control information for the at least two cells within the same subframe; and step 502: the UE allocates power for the uplink channels of the at least two cells according to a result of priority sorting; wherein when allocating power for an uplink channel, needed power of one or more uplink channels with lower priorities than that of the uplink channel is taken into account.

In this embodiment, the at least two cells may be formed by a macro base station and a small base station. For example, they may be a macro cell under a macro base station and one or more small cells under a small base station (small cell eNB), may also be a primary cell at a dominant position and one or more secondary cell at subordinate positions, or may also be multiple small cells, and the present disclosure is not limited thereto. Following description is given taking only two cells as an example, cases of more than two cells are similar to this.

In this embodiment, taking a case where the power of the UE is limited into account, if the power of the UE is not limited, a solution in the relevant art may be used, which shall not be described herein any further. There may exist a non-ideal backhaul between base stations of the at least two cells; however, the present disclosure is not limited thereto. Multiple cells belonging to the same base station and connected by ideal backhauls may be dealt with by using the relevant art.

In this embodiment, in the same subframe may refer to subframes of identical subframe indices; however, the present disclosure is not limited thereto. For example, if the two cells are not synchronized, in the same subframe is not limited to be subframes of identical subframe indices, but may be a period of time of the same length as a subframe in a time dimension.

In this embodiment, before step 501, the UE may generate ACK/NACK feedback according to a received downlink signal, or generate corresponding uplink control information according to a period and an offset configured for periodic CSI (Channel State Information) or according to received aperiodic CSI triggering indication or according to a request for needed resources of an uplink traffic.

After step 502, the UE may transmit a signal of an uplink channel according to a result of power allocation for the uplink channel. The relevant art may be referred to for particular contents of generation of the UCI, and transmission of the uplink channel, etc.

In an implementation, taking a PUCCH as an example, uplink channels of the at least two cells may include: a PUCCH for a cell and a PUCCH for another cell. Whether the UE needs to transmit a PUCCH at a serving cell in the same subframe and transmit PUCCHs at other serving cells may be determined first. And the sorting priorities of uplink channels of the at least two cells may particularly include: determining priorities of the PUCCHs according to a type of the UCI contained in the PUCCHs, and/or types or indices of the at least two cells.

In another implementation, taking a PUSCH as an example, uplink channels of the at least two cells may include: a PUSCH for a cell and a PUSCH for another cell. And the sorting priorities of uplink channels of the at least two cells may particularly include: determining priorities of the PUSCHs according to a type of the UCI contained in the PUSCHs, and/or types or indices of the at least two cells.

In a further implementation, taking a PUCCH and a PUSCH as an example, uplink channels of the at least two cells may include: a PUCCH for a cell and a PUSCH for another cell. And the sorting priorities of uplink channels of the at least two cells may particularly include: determining priorities of the uplink channels according to any one of a type of the UCI contained in the uplink channels, types or indices of the at least two cells, and types of the uplink channels, or a combination thereof.

It should be noted that the uplink channels of the at least two cells and the sorting the priorities of the uplink channels of the at least two cells are illustrated only; however, the present disclosure is not limited thereto. Relevant technologies, such as PCT/CN2013/081382, etc., may be referred to for uplink channels of at least two cells and sorting priorities.

In this embodiment, the priorities of the uplink channels of the at least two cells may be sorted according to a predetermined priority criterion first. The predetermined priority criterion may be: determining a sort of priorities according to a type of an uplink signal, or a content carried by the uplink signal, and/or a type of a base station.

After the priorities are determined, power allocation is performed on the uplink channels in a descending sort of the priorities, that is, power allocation is performed first on an uplink channel of a high priority. Transmission power needed by an uplink channel of a low priority (which may also be referred to as needed power, or lowest transmission power) needs to be taken into account in the allocated power. For example, lowest transmission power of uplink signals in cells or base stations may be set. Then, when the power allocation is performed on the uplink channel of a high priority, it needs to be ensured that sufficient transmission power is reserved for satisfying the lowest transmission power of the uplink channel of a low priority.

In this embodiment, power Pi allocated for an i-th uplink channel may be obtained according to a formula as below:

$$p_i = \begin{cases} \min\left(p_{des\_i}, P_{c\,max} - \sum_{j=2...M} p_{min\_j}\right), i = 1 \\ \min\left(p_{des\_i}, P_{c\,max} - \sum_{k=1...i-1} p_k - \sum_{j=i+1...M} p_{min\_j}\right), i = 2, ..., M-1 \\ \max\left(P_{c\,max} - \sum_{l=1...M-1} p_l, p_{min\_i}\right), i = M \end{cases};$$

where, 1, . . . , M are indices of the uplink channels with priorities being sorted descendingly, M is the number of the uplink channels with priorities being sorted, $P_{cmax}$ is the maximum uplink transmission power (that is PCMAX) of the UE, $P_{de\_i}$ refers to transmission power adopted by the UE for the i-th uplink channel expected by a base station, and $P_{min\_i}$ is power needed by a j-th uplink channel.

The PCMAX (may also be named as Pcmax) of the UE and power needed by the uplink channels need to satisfy a condition as below:

$$P_{c\,max} \geq \sum_{i=1,...,M} p_{min\_i}).$$

In this embodiment, the power needed by the uplink channels may be predetermined, and may be configured for different base stations; for example, needed power may be configured for each of the different base stations, and power needed by uplink channels under the same base station is identical; or needed power may be configured for different cells; for example, needed power may be configured for each of the different cells, and need power of uplink channels under the same cell is identical; or needed power may be configured for different uplink channels.

It should be noted that the above formula is a particular implementation of the present disclosure only; however, the present disclosure is not limited thereto. For example, the above formula may be suitably adjusted. In performing power allocation on an uplink channel of a relatively high priority, needed power of one or more uplink channels of relatively low priorities needs only to be taken into account, and this will fall within the protection scope of the present disclosure.

Taking that needed power of different uplink channels is configured for different base stations as an example, assuming that minimum transmission power of the uplink signals at the base stations is $P_{min\_eNBi}$ and the minimum transmission power of the base stations may be less than or equal to the PCMAX $P_{cmax}$ of the UE, when the UE allocates uplink power for an uplink channel of a high priority of a base station i, it may be that $P_i = \min(P_{des\_i}, P_{cmax} - $ a sum of actual transmission power $P_i$ of all base stations of priorities higher than that of the current base station—a sum of minimum $P_{min\_eNBi}$ of all base stations of priorities lower than that of the current base station); where, $P_{des\_i}$ is the transmission power used by the UE that is expected by the base station, such as the power calculated by using formulae (1), (2) and (3).

When the UE allocates power for uplink channels of low priorities of a base station j, it needs to ensure that its available power is not less than its minimum transmission power, which may be, for example, $P_j = \max(P_{cmax} - $ a sum of actual transmission power $P_i$ of all base stations of priorities higher than that of the current base station, $P_{min\_eNBj}$).

In this embodiment, assuming that the UE is connected to a macro base station and a small base station at the same time and there is only one cell under each base station keeping in connection with the UE, when the UE transmits uplink signals to the macro base station and the small base station at the same time, if a sum of needed power of two uplink signals exceeds the PCMAX of the UE, priority sorting and power allocation will be performed on the two uplink signals.

Figure 6:
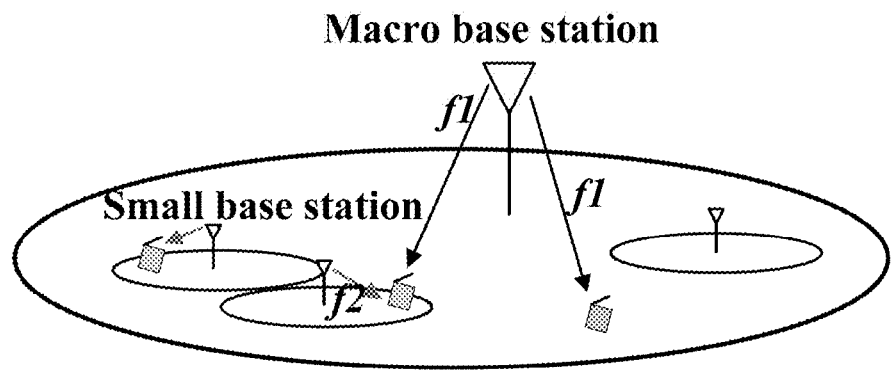
FIG. 6 is a schematic diagram of keeping in connection by the UE with a macro eNB and a small base station.
Figure 7:
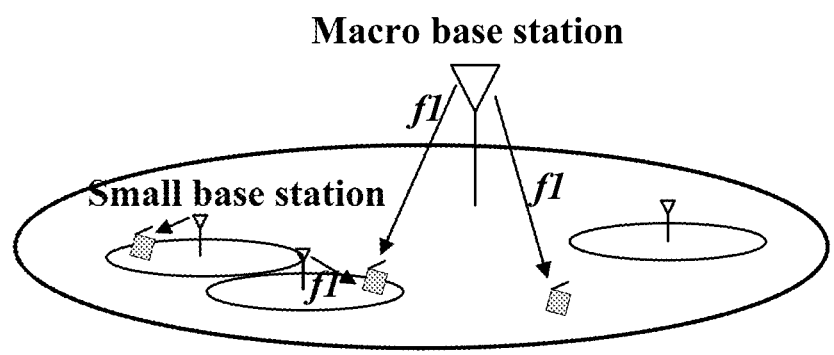
FIG. 7 is another schematic diagram of keeping in connection by the UE with the macro eNB and the small base station.
Figure 8:
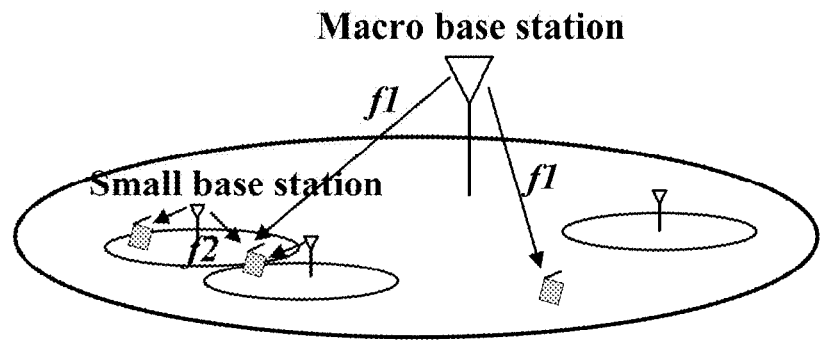
FIG. 8 is a further schematic diagram of keeping in connection by the UE with the macro eNB and the small eNB.

FIG. 6 is a schematic diagram of keeping in connection by the UE with a macro base station and small base stations. As shown in FIG. 6, the UE may keep in connection with the macro base station by using a frequency f1, and keep in connection with a small base station by using a frequency f2. FIG. 7 is another schematic diagram of keeping in connection by the UE with a macro base station and small base stations. As shown in FIG. 7, the UE may keep in connection with the macro base station by using the frequency f1, and keep in connection with a small base station by also using the frequency f1. And FIG. 8 is a further schematic diagram of keeping in connection by the UE with a macro base station and small base stations. As shown in FIG. 8, the UE may keep in connection with the macro base station by using the frequency f1, keep in connection with a small base station by using the frequency f2, and keep in connection with another small base station by also using the frequency f2.

As shown in FIGS. 6-8, the UE may operate under carrier aggregation (inter-eNB) similar to that under different eNBs. As small base stations and a macro base station belong to different eNBs and the backhauls are non-ideal, uplink control signals are more suitable to be transmitted in uplink channels of the eNBs. Then, it may possibly occur that PUCCHs are simultaneously transmitted in the small base stations and the macro base station, or PUSCHs containing UCI are transmitted in the small base stations and PUSCHs containing UCI are also transmitted in the macro base station, or PUSCHs containing UCI are transmitted in the small base stations and PUCCHs are transmitted in the macro base station, or PUCCHs are transmitted in the small base stations and PUSCHs containing UCI are transmitted in the small base stations, or PUCCHs and PUSCHs containing UCI are transmitted in the small base stations and only PUCCHs are transmitted in the macro base station, or PUCCHs and PUSCHs containing UCI are transmitted in the macro base station and only PUCCHs are transmitted in the small base stations, or PUCCHs and PUSCHs containing UCI are transmitted in the small base stations and only PUSCHs containing UCI are transmitted in the macro base station, or PUCCHs and PUSCHs containing UCI are transmitted in the macro base station and only PUSCHs containing UCI are transmitted in the small base stations, or PUCCHs and PUSCHs containing UCI are transmitted in the small base stations and PUCCHs and PUSCHs containing UCI are also transmitted in the macro base station. Combinations of the PUCCHs, PUSCHs containing UCI and PUSCHs containing no UCI shall not be described herein any further.

It should be noted that the UE keeping in connection with a macro base station and small base stations is only illustrated above; however, the present disclosure is not limited thereto. The embodiments of the present disclosure shall be described in detail taking the scenarios shown in FIGS. 6-8 as examples.

For example, assuming that the UE transmit PUSCHs to the macro base station and transmit PUCCHs to the small base stations, if a priority criterion is followed, for example, according to a type of information carried by uplink channels, a channel containing physical layer control information is preferential over a channel containing no physical layer control information, that is, priorities of PUCCHs of small base stations are higher than those of PUCCHs of a macro base station, then the UE will allocate power for the PUCCHs of the small base stations, and then allocate power for the PUSCHs of the macro base station.

Assuming that in scheduling by the base stations, respectively expected uplink transmission power values are 4 and 8 and maximum uplink transmission power of the UE is 10, a sum of the two pieces of power, 12, exceeds the maximum uplink transmission power of the UE. And assuming that predetermined minimum transmission power of uplink signals of two base stations is 5 for the macro base station and 2 for the small base station, respectively, in allocating power first by the UE for the small base station, it needs to ensure that after the power is allocated for the PUCCHs of the small base station, the remained power is greater than or equal to 5, that is, final transmission power of the PUCCHs of the small base station is $P_i = \min(P_{des\_i}, Pcmax - P_{min\_MeNB}) = \min(4, 10-5) = 4$. And final transmission power of the PUSCHs of the macro base station is $P_j = \max(Pcmax - Pi, P_{min\_MeNB}) = \max(10-4, 5) = 6$.

For another example, assuming that the UE transmit PUSCHs to the macro base station and transmit PUCCHs to the small base stations, if a priority criterion is followed, for example, according to a type of information carried by uplink channels, a channel containing physical layer control information is preferential over a channel containing no physical layer control information, that is, priorities of PUCCHs of small base stations are higher than those of PUCCHs of a macro base station, then the UE will allocate power for the PUCCHs of the small base stations, and then allocate power for the PUSCHs of the macro base station.

Assuming that in scheduling by the base stations, respectively expected uplink transmission power values are 6 and 8 and maximum uplink transmission power of the UE is 10, a sum of the two pieces of power, 14, exceeds the maximum uplink transmission power of the UE. And assuming that predetermined minimum transmission power of uplink signals of two base stations is 5 for the macro base station and 2 for the small base station, respectively, in allocating power first by the UE for the small base station, it needs to ensure that after the power is allocated for the PUCCHs of the small base station, the remained power is greater than or equal to 5, that is, final transmission power of the PUCCHs of the small base station is $P_j=\min(P_{des\_i}, \text{Pcmax}-P_{min\_MeNB})=\min(6, 10-5)=5$. And final transmission power of the PUSCHs of the macro base station is $P_j=\max(\text{Pcmax}-P_i, P_{min\_MeNB})=\max(10-6, 5)=5$.

In this embodiment, the UE may receive high-layer configuration information transmitted by the base station, and directly configure needed power of the uplink signals according to the high-layer configuration information; or determine the needed power according to an interval provided by the high-layer configuration information, and configure the needed power of the uplink signals according to the determined needed power. In the above two examples, the minimum transmission power of the base station is configured via a high layer, or is determined by the UE based on an interval provided by high-layer configuration information.

In this embodiment, different needed power may be configured according to different types of the uplink channels. For example, different minimum transmission power may be configured for the PUCCHs, PUSCHs with UCI and PUSCHs with no UCI. Or different needed power may be configured according to different carrying contents carried by the uplink channels. For example, different minimum transmission power may be determined according to carrying types carried by the PUSCHs/PUCCHs, and minimum transmission power of PUSCHs carrying control signaling may set to be relatively large.

In this embodiment, the needed power of the uplink channels may be configured for different cells. Different needed power may be configured for different cells under the same base station. For example, the UE may keep in connection with multiple cells under a base station; minimum transmission power configured for a primary cell (PCell) of the UE may be greater than that of other cells. And furthermore, when minimum transmission power is configured for each cell, minimum transmission power may not be configured for each base station.

Figure 9:
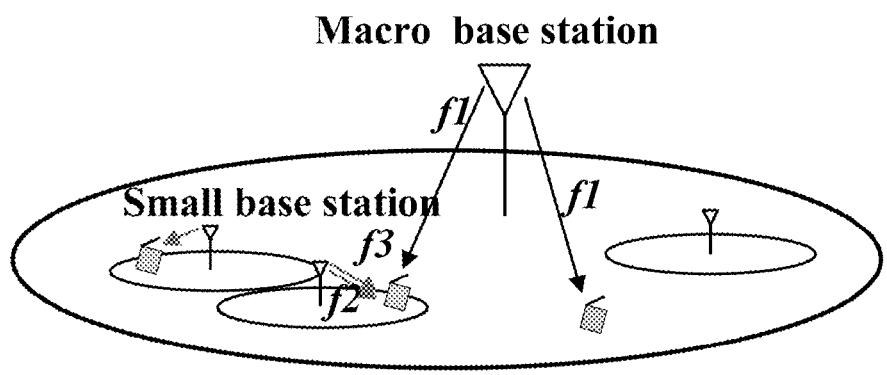
FIG. 9 is still another schematic diagram of keeping in connection by the UE with the macro base station and the small base station.

FIG. 9 is still another schematic diagram of keeping in connection by the UE with the macro base station and the small base station. As shown in FIG. 9, the UE may keep in connection with a cell under the macro base station by using the frequency f1, and keep in connection with two cells of a small base station by using frequencies f2 and f3, respectively. The embodiment of the present disclosure shall be described in detail taking the scenario shown in FIG. 9 as an example.

For example, it is assumed that the UE is connected to a macro base station and a small base station at the same time, and a cell under the macro base station and two cell under the small base station keep in connection with the UE. And it is assumed that the macro base station is an MeNB, a cell A under the macro base station is a PCell, and the small base station is an SeNB, a cell B under the small base station is a Pcell, and a cell C under the small base station is an Scell.

Then, when the UE transmit uplink signals at the same time to the cell A of the macro base station and the cell B of the small base station, if a sum of needed power of two uplink signals exceeds the PCMAX of the UE, priority sorting and power allocation will be performed on the two uplink signals. Assuming that the UE transmits PUSCHs with ACK/NACK to the macro base station and transmits PUCCHs with CSI to the small base station, if a priority criterion is followed, for example, when physical layer control information is contained, a priority of the ACK/NACK is higher than that periodic CSI, and priorities of the PUSCHs of the macro base station are higher than those of the PUCCHs of the small base station, the UE will allocate power for the PUSCHs of the macro base station, and then for the PUCCHs of the cell B of the small base station.

Assuming that in scheduling by the base stations, respectively expected uplink transmission power values are 10 and 4 and maximum uplink transmission power of the UE is 10, a sum of the two pieces of power, 14, exceeds the maximum uplink transmission power of the UE. And assuming that predetermined minimum transmission power of uplink signals of two base stations is 5 for the cell A of the macro base station, 4 for the cell B of the small base station and 2 for the cell C of the small base station, respectively.

Then, in allocating power first by the UE for the PUSCHs of the macro base station, it needs to ensure that after the power is allocated for the PUSCHs of the macro base station, the remained power is greater than or equal to the minimum transmission power, 4, of the cell B of the small base station, that is, final transmission power of the PUSCHs of the cell A of the macro base station is $P_A=\min(P_{des\_A}, \text{Pcmax}-P_{min\_cellB})=\min(10, 10-4)=6$, and final transmission power of the PUCCHs of the cell B of the small base station is $P_B=\max(\text{Pcmax}-P_A, P_{min\_cellB})=\max(10-7, 4)=4$. And when the UE transmit uplink signals at the same time to the cell A of the macro base station and the cell C of the small base station, if the priority of the cell A of the macro base station is still highest according to the priority criterion, the final transmission power of the PUSCHs of the cell A of the macro base station is $P_A=\min(P_{des\_A}, \text{Pcmax}-P_{min\_cellC})=\min(10, 10-2)=8$, and final transmission power of the cell C of the small base station is $P_C=\max(\text{Pcmax}-P_A, P_{min\_cellC})=\max(10-8, 2)=2$.

Figure 10:
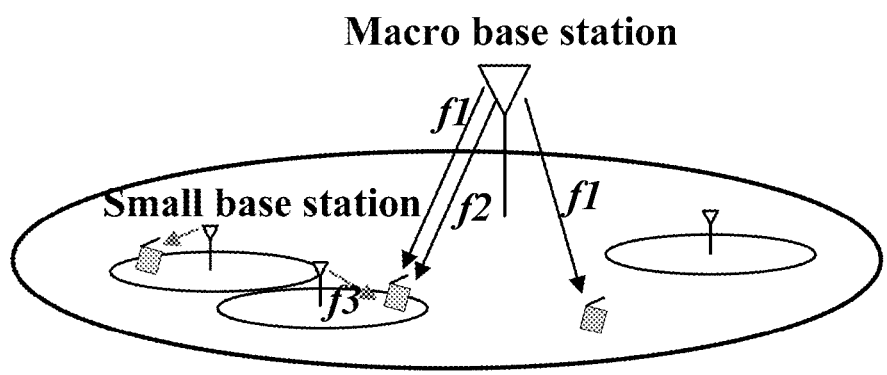
FIG. 10 is yet another schematic diagram of keeping in connection by the UE with the macro base station and the small base station.

FIG. 10 is yet another schematic diagram of keeping in connection by the UE with the macro base station and the small base station. As shown in FIG. 10, the UE may keep in connection with two cells of the macro base station by using the frequencies f1 and f2, respectively, and keep in connection with a cell of the small base station by using the frequency f3. The embodiment of the present disclosure shall be described in detail taking the scenario shown in FIG. 10 as an example.

For example, it is assumed that the UE is connected to the cells A and B of the macro base station and the cell C of the small base station at the same time, and at the same time, transmit uplink signals. And if a sum of needed power of three uplink signals exceeds the PCMAX of the UE, priority sorting and power allocation will be performed on the three uplink signals.

It is assumed that the UE transmits PUCCHs with ACK/NACK to the cell A of the macro base station (Pcell), transmits PUSCHs with CSI to the cell B of the macro base station (Scell) and transmits PUSCHs to the cell C of the small base station. If expected power in scheduling by the base stations is 10, 7 and 3, respectively, a sum of three pieces of power exceeds the PCMAX 10 of the UE, hence, priority sorting and power allocation need to be performed on the three pieces of power.

It is assumed that minimum transmission power of the three pieces of power is 6, 4 and 1, respectively. According to the priority criterion, the PUCCHs with ACK/NACK of the cell A>the PUSCHs with CSI of the cell B>the PUSCHs of the cell C. Then, power allocation is first performed on the cell A, $P_A=\min(P_{des\_A}, Pcmax-P_{min\_cellB}-P_{min\_cellC})=\min(10, 10-4-1)=5$, then power allocation is performed on the cell B, $P_B=\min(P_{des\_B}, Pcmax-P_A-P_{min\_cellC})=\min(7, 10-5-1)=4$, and power allocation is finally performed on the cell C, $P_C=\max(Pcmax-P_A-P_B, P_{min\_cellC})=1$.

In this embodiment, in allocating transmission power for the uplink channels of the different base stations, power of one or more cells in each base station may only be taken into account, and power of which cell is taken into account may be determined according to priorities of the cells in a base station. For example, priority sorting may be first performed in a base station, and power of a cell in each base station of a highest priority is only taken into account in calculating the transmission power of the uplink signals of the different base stations, that is, if only one cell of a base station is taken into account, this cell is a cell of a highest priority in a single base station.

For example, in the above example, within the macro base station, the priority of the cell A is higher than that of the cell B. Hence, power allocation may be first performed on the cell A, $P_A=\min(P_{des\_A}, Pcmax-P_{min\_cellC})=\min(10, 10-1)=9$, then power allocation is performed on the cell B, $P_B=\min(P_{des\_B}, Pcmax-P_A-P_{min\_cellC})=\min(7, 10-9-1)=0$, and power allocation is finally performed on the cell C, $P_C=\max(Pcmax-P_A-P_B, P_{min\_cellC})=1$.

It can be seen from the above embodiment that in a case where the power of the UE is limited, by taking the needed power of the uplink channels of relatively low priorities into account, not only power may be allocated for uplink channels of high priorities, but also uplink channels of low priorities may be transmitted punctually, thereby further improving overall performance of uplink information transmission.

Embodiment 2

An embodiment of the present disclosure provides an apparatus for controlling power of an uplink channel, configured in a UE keeping in connection with at least two cells. This embodiment corresponds to the method for controlling power of an uplink channel described in Embodiment 1, with contents identical to those in Embodiment 1 being not going to be described herein any further.

Figure 11:
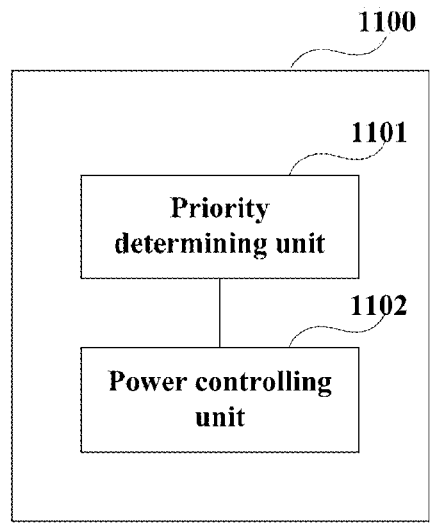
FIG. 11 is a schematic diagram of a structure of the apparatus for controlling power of an embodiment of the present disclosure.

FIG. 11 is a schematic diagram of a structure of the apparatus for controlling power of the embodiment of the present disclosure. As shown in FIG. 11, the apparatus 1100 for controlling power includes a priority determining unit 1101 and a power controlling unit 1102. Other components of the apparatus 1100 for controlling power are not shown in the figure, and the relevant art may be referred to.

The priority determining unit 1101 is configured to sort priorities of uplink channels of the at least two cells when transmitting signals of the uplink channels containing uplink control information for the at least two cells within the same subframe, and the power controlling unit 1102 is configured to allocate power for the uplink channels of the at least two cells according to a result of priority sorting; when allocating power for an uplink channel, needed power of one or more uplink channels with lower priorities than that of the uplink channel is taken into account.

In this embodiment, the power controlling unit 1102 is configured to perform the power allocation by using a formula below, power Pi allocated for an i-th uplink channel is:

$$p_i = \begin{cases} \min\left(p_{des\_i}, P_{c\,max} - \sum_{j=2...M} p_{min\_j}\right), i=1 \\ \min\left(p_{des\_i}, P_{c\,max} - \sum_{k=1...i-1} p_k - \sum_{j=i+1...M} p_{min\_j}\right), i=2,\ldots,M-1 \\ \max\left(P_{c\,max} - \sum_{l=1...M-1} p_l, p_{min\_i}\right), i=M \end{cases};$$

where, 1, ..., M are serial numbers of uplink channels with priorities being descendingly sorted, M is the number of the uplink channels of which priorities are sorted, $P_{cmax}$ is maximum uplink transmission power of the UE, $P_{des\_i}$ is transmission power used by the UE for the i-th uplink channel that is expected by a base station, and $P_{min\_j}$ is needed power of a j-th uplink channel.

The maximum uplink transmission power of the UE and needed power of the uplink channels satisfy a condition as below:

$$P_{c\,max} \geq \sum_{i=1,\ldots,M} p_{min\_i}).$$

In this embodiment, the needed power of the uplink channels is configured for different base stations, or is configured for different cells, or is configured for different uplink channels.

In this embodiment, as shown in FIG. 11, the apparatus 1100 for controlling power may further include a configuring unit 1103 configured to receive high-layer configuration information transmitted by the base station, and configure directly the needed power of the uplink channels according to the high-layer configuration information; or determine needed power according to an interval provided by the high-layer configuration information, and configure the needed power of the uplink channels according to the determined needed power.

An embodiment of the present disclosure further provides a UE, including the apparatus 1100 for controlling power as described above.

Figure 12:
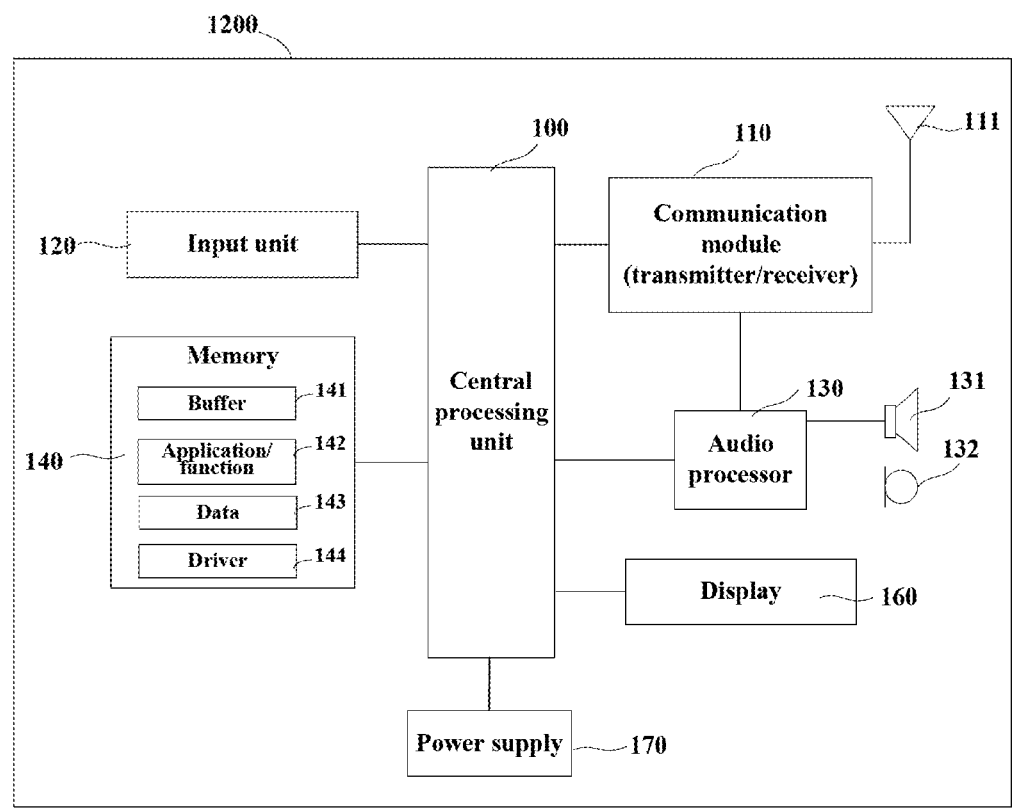
FIG. 12 is a schematic diagram of a structure of the UE of an embodiment of the present disclosure.

FIG. 12 is a block diagram of a systematic structure of the UE 1200 of the embodiment of the present disclosure. As shown in FIG. 5, the UE 1200 may include a central processing unit 100 and a memory 140, the memory 140 being coupled to the central processing unit 100. It should be noted that this figure is illustrative only, and other types of structures may also be used, so as to supplement or replace this structure and achieve telecommunications function or other functions.

In an implementation, the functions of the apparatus 1100 for controlling power may be integrated into the central processing unit 100. The central processing unit 100 may be configured to carry out the method for controlling power as described in Embodiment 1.

In another implementation, the apparatus 1100 for controlling power and the central processing unit 100 may be configured separately. For example, the apparatus 1100 for controlling power may be configured as a chip connected to the central processing unit 100, with its functions being realized under control of the central processing unit 100.

As shown in FIG. 12, the UE 1200 may further include a communication module 110, an input unit 120, an audio processor 130, a display 160 and a power supply 170. It should be noted that the UE 1200 does not necessarily include all the parts shown in FIG. 12. And furthermore, the UE 1200 may include components not shown in FIG. 12, and the relevant art may be referred to.

As shown in FIG. 12, the central processing unit 100 is sometimes referred to as a controller or control, and may include a microprocessor or other processor devices and/or logic devices. The central processing unit 100 is configured to receive input and control operations of every components of the UE 1200.

The memory 140 may be, for example, one or more of a buffer memory, a flash memory, a hard drive, a mobile medium, a volatile memory, a nonvolatile memory, or other suitable devices. It may store information on a failure, and may further store programs executing related information. And the central processing unit 100 may execute the programs stored in the memory 140, so as to realize information storage or processing, etc. Functions of other parts are similar to those of the relevant art, which shall not be described herein any further. The parts of the UE 1200 may be realized by specific hardware, firmware, software, or any combination thereof, without departing from the scope of the present disclosure.

It can be seen from the above embodiment that in a case where the power of the UE is limited, by taking the needed power of the uplink channels of relatively low priorities into account, not only power may be allocated for uplink channels of high priorities, but also uplink channels of low priorities may be transmitted punctually, thereby further improving overall performance of uplink information transmission.

Embodiment 3

Figure 13:
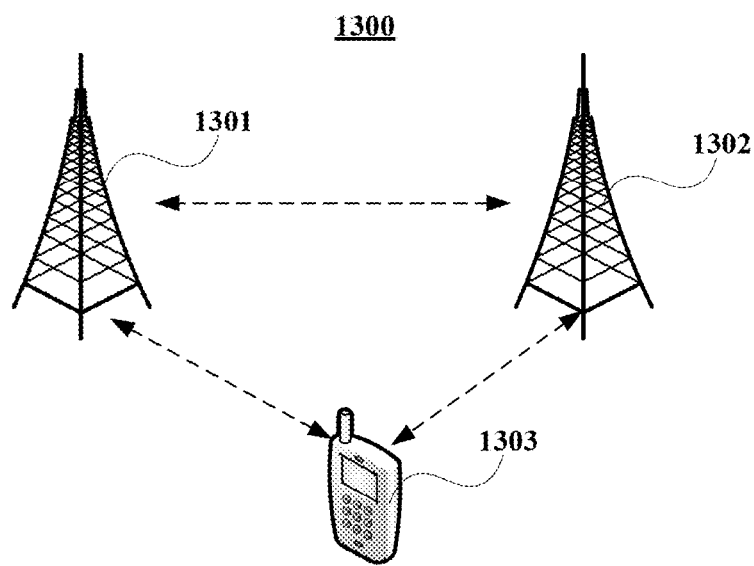
FIG. 13 is a schematic diagram of a structure of the communication system of an embodiment of the present disclosure.

An embodiment of the present disclosure provides a communication system. FIG. 13 is a schematic diagram of a structure of the communication system of The embodiment of the present disclosure. As shown in FIG. 13, the communication system 1300 includes a first base station 1301, a second base station 1302 and a UE 1303. The first base station or the second base station may be a macro base station, or a small base station, etc., and the present disclosure is not limited thereto.

The UE 1303 keeps in connection with at least two cells formed by the first base station 1301 and the second base station 1302, and is configured to sort priorities of uplink channels of the at least two cells when transmitting signals of the uplink channels containing uplink control information for the at least two cells within the same subframe, and allocate power for the uplink channels of the at least two cells according to a result of priority sorting; when allocating power for an uplink channel, needed power of one or more uplink channels with lower priorities than that of the uplink channel is taken into account.

An embodiment of the present disclosure further provides a computer-readable program, when the program is executed in a UE, the program enables the UE to carry out the method for controlling power of an uplink channel as described in Embodiment 1.

An embodiment of the present disclosure further provides a storage medium in which a computer-readable program is stored, the computer-readable program enables a UE to carry out the method for controlling power of an uplink channel as described in Embodiment 1.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A method for controlling power of an uplink channel, applicable to a UE keeping in connection with at least two cells, the method comprising:
   sorting, by the UE, priorities of uplink channels of the at least two cells, when transmitting signals of the uplink channels containing uplink control information for the at least two cells within the same subframe; and
   allocating power for the uplink channels of the at least two cells according to a result of priority sorting; wherein when allocating power for an uplink channel, needed power of one or more uplink channels with lower priorities than that of the uplink channel is taken into account.

2. The method for controlling power according to claim 1, wherein power $P_i$ allocated for an i-th uplink channel is obtained according to a formula below:

$$p_i = \begin{cases} \min\left(p_{des\_i}, p_{c\,max} - \sum_{j=2...M} p_{min\_j}\right), i = 1 \\ \min\left(p_{des\_i}, p_{c\,max} - \sum_{k=1...i-1} p_k - \sum_{j=i+1...M} p_{min\_j}\right), i = 2, \ldots, M-1 \\ \max\left(p_{c\,max} - \sum_{l=1...M-1} p_l, p_{min\_i}\right), i = M \end{cases};$$

where, 1, ..., M are serial numbers of uplink channels with priorities being descendingly sorted, M is the number of the uplink channels of which priorities are sorted, $P_{cmax}$ is maximum uplink transmission power of the UE, $P_{des\_i}$ transmission power used by the UE for the i-th uplink channel that is expected by a base station, and $P_{min\_j}$ is needed power of a j-th uplink channel.

3. The method for controlling power according to claim 2, wherein the maximum uplink transmission power of the UE and needed power of the uplink channels satisfy a condition as below:

$$P_{c\,max} \geq \sum_{i=1,\ldots,M} p_{min\_i}).$$

4. The method for controlling power according to claim 1, wherein the needed power of the uplink channels is configured for different base stations.

5. The method for controlling power according to claim 4, wherein the method further comprises:
   taking power of one or more cells in each base station only into account when allocating transmission power for uplink channels of different base stations.

6. The method for controlling power according to claim 5, wherein the power of one or more cells in the base station is determined according to the priorities of the cells in the base station.

7. The method for controlling power according to claim 1, wherein the needed power of the uplink channels is configured for different cells.

8. The method for controlling power according to claim 7, wherein the method further comprises: configuring different needed power for different cells under the same base station.

9. The method for controlling power according to claim 1, wherein the needed power of the uplink channels is configured for different uplink channels.

10. The method for controlling power according to claim 9, wherein different needed power is configured according to different types of the uplink channels, or different needed power is configured according to different contents carried by the uplink channels.

11. The method for controlling power according to claim 1, wherein the method further comprise:
   receiving, by the UE, high-layer configuration information transmitted by a base station, and configuring directly the needed power of the uplink channels according to the high-layer configuration information; or
   determining needed power according to an interval provided by the high-layer configuration information, and configuring the needed power of the uplink channels according to the determined needed power.

12. The method for controlling power according to claim 1, wherein the sorting priorities of uplink channels of the at least two cells comprises:
   determining the priorities of the uplink channels according to a type of the uplink control information; or
   determining the priorities of the uplink channels according to a type of the uplink control information and a type or an index of the at least two cells.

13. An apparatus for controlling power of an uplink channel, configured in a UE keeping in connection with at least two cells, the apparatus comprising:
   a priority sorting unit configured to sort priorities of uplink channels of the at least two cells when transmitting signals of the uplink channels containing uplink control information for the at least two cells within the same subframe; and
   a power allocating unit configured to allocate power for the uplink channels of the at least two cells according to a result of priority sorting;
   wherein when allocating power for an uplink channel, needed power of one or more uplink channels with lower priorities than that of the uplink channel is taken into account.

14. The apparatus for controlling power according to claim 13, wherein the power allocating unit is configured to perform power allocation by using a formula below, and wherein power $P_i$ allocated for an i-th uplink channel is:

$$p_i = \begin{cases} \min\left(p_{des\_i},\, p_{c\,max} - \sum_{j=2\ldots M} p_{min\_j}\right),\, i = 1 \\ \min\left(p_{des\_i},\, p_{c\,max} - \sum_{k=1\ldots i-1} p_k - \sum_{j=i+1\ldots M} p_{min\_j}\right),\, i = 2,\ldots,M-1 \\ \max\left(p_{c\,max} - \sum_{l=1\ldots M-1} p_l,\, p_{min\_i}\right),\, i = M \end{cases};$$

where, 1, ..., M are serial numbers of uplink channels with priorities being descendingly sorted, M is the number of the uplink channels of which priorities are sorted, $P_{cmax}$ is maximum uplink transmission power of the UE, $P_{des\_i}$ transmission power used by the UE for the i-th uplink channel that is expected by a base station, and $P_{min\_j}$ is needed power of a j-th uplink channel.

15. The apparatus for controlling power according to claim 13, wherein the maximum uplink transmission power of the UE and needed power of the uplink channels satisfy a condition as below:

$$P_{c\,max} \geq \sum_{i=1,\ldots,M} p_{min\_i}).$$

16. The apparatus for controlling power according to claim 13, wherein the needed power of the uplink channels is configured for different base stations, or is configured for different cells, or is configured for different uplink channels.

17. The apparatus for controlling power according to claim 13, wherein the apparatus further comprises:
   a configuring unit configured to receive high-layer configuration information transmitted by a base station, and configure directly the needed power of the uplink channels according to the high-layer configuration information; or
   determine needed power according to an interval provided by the high-layer configuration information, and configure the needed power of the uplink channels according to the determined needed power.

18. A communication system, comprising:
   a UE keeping in connection with at least two cells and configured to sort priorities of uplink channels of the at least two cells when transmitting signals of the uplink channels containing uplink control information for the at least two cells within the same subframe, and allocate power for the uplink channels of the at least two cells according to a result of priority sorting;

wherein when allocating power for an uplink channel, needed power of one or more uplink channels with lower priorities than that of the uplink channel is taken into account.

* * * * *